June 26, 1945.  B. H. VINE  2,379,263
APPARATUS FOR DETERMINING THE FLATNESS OF GLASS PLATES
Filed Nov. 19, 1943  3 Sheets-Sheet 1

INVENTOR
BENJAMIN H. VINE
BY Olen E. Bee
ATTORNEY

June 26, 1945.   B. H. VINE   2,379,263
APPARATUS FOR DETERMINING THE FLATNESS OF GLASS PLATES
Filed Nov. 19, 1943   3 Sheets-Sheet 2

BENJAMIN H. VINE Inventor

By Olen E. Bee
Attorney

June 26, 1945.   B. H. VINE   2,379,263
APPARATUS FOR DETERMINING THE FLATNESS OF GLASS PLATES
Filed Nov. 19, 1943   3 Sheets-Sheet 3
Fig. 5.
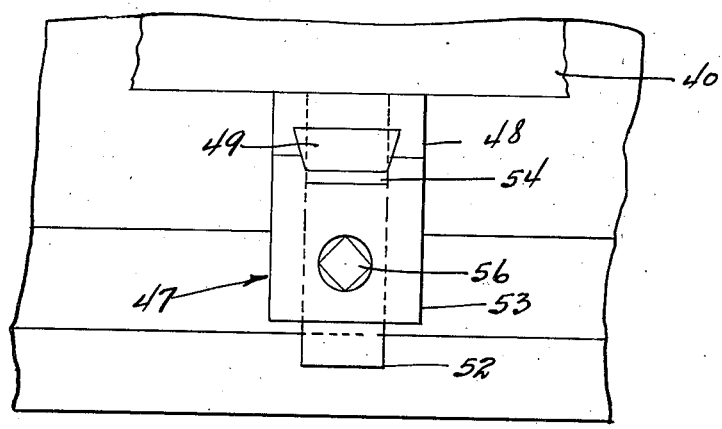
Fig. 6.
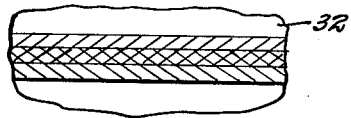
Fig. 7.
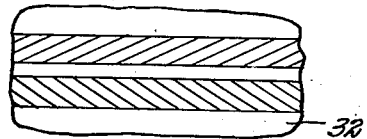
Fig. 8.
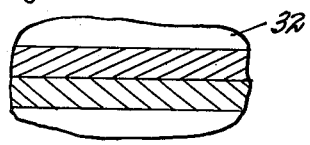
Fig. 9.
Fig. 10.
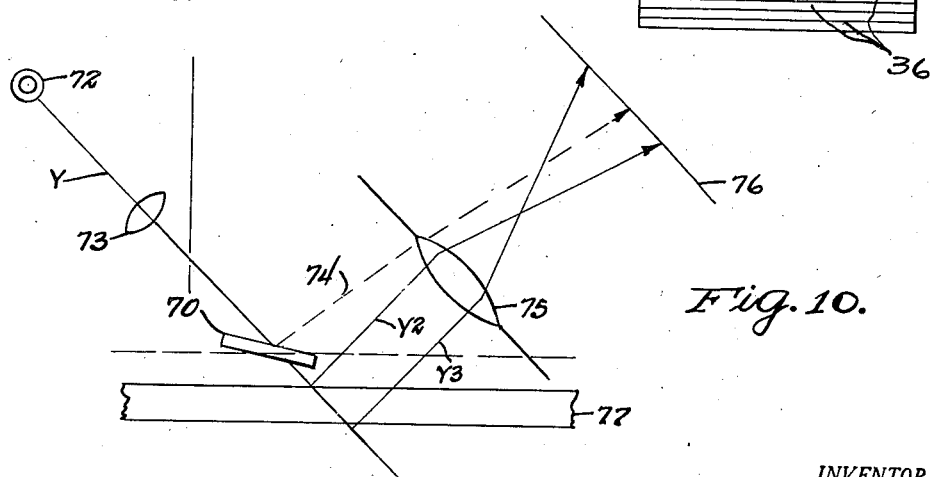
INVENTOR.
BENJAMIN H. VINE
BY
Olen E. Bee
ATTORNEY Patented June 26, 1945

2,379,263

UNITED STATES PATENT OFFICE 2,379,263

APPARATUS FOR DETERMINING THE FLATNESS OF GLASS PLATES

Benjamin H. Vine, Tarentum, Pa., assignor to Pittsburgh Plate Glass Company, Allegheny County, Pa., a corporation of Pennsylvania Application November 19, 1943, Serial No. 510,935

5 Claims. (Cl. 88—14)

The present invention relates to an apparatus for determining the general surface contours of glass plates and it has particular relation to the provision of apparatus suitable for indicating the deviation from a true plane in the surfaces of such plates.

One object of the invention is to provide an apparatus by means of which the surface flatness of glass plates can be quickly and accurately determined.

A second object is to provide an apparatus by application of which determinations of the foregoing character can be made in sheets or plates of glass regardless of the dimensions of the latter.

These and other objects of the invention will be apparent from consideration of the following specification and the appended claims.

For a better understanding of the invention reference may now be had to the accompanying drawings in which like numerals refer to like parts throughout and in which Fig. 1 is a sectional view of an apparatus suitable for use in practicing the invention;

Fig. 5 is a fragmentary plan view of the construction shown in Fig. 4;

Figs. 6, 7, and 8 are fragmentary details illustrating the appearance of the light bands which indicate the character of the surface being examined;

Fig. 9 illustrates a suitable embodiment of a glass screen that may be employed in making observations of the light bands or lines;

Fig. 10 illustrates diagrammatically a further embodiment of the invention.

Figure 1:
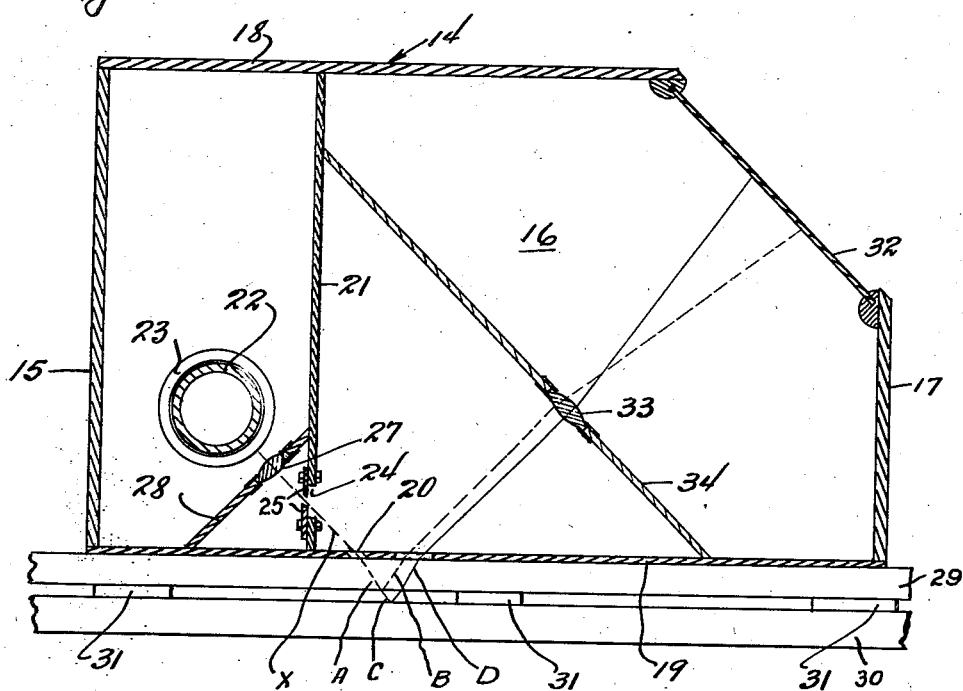
Figure 2:
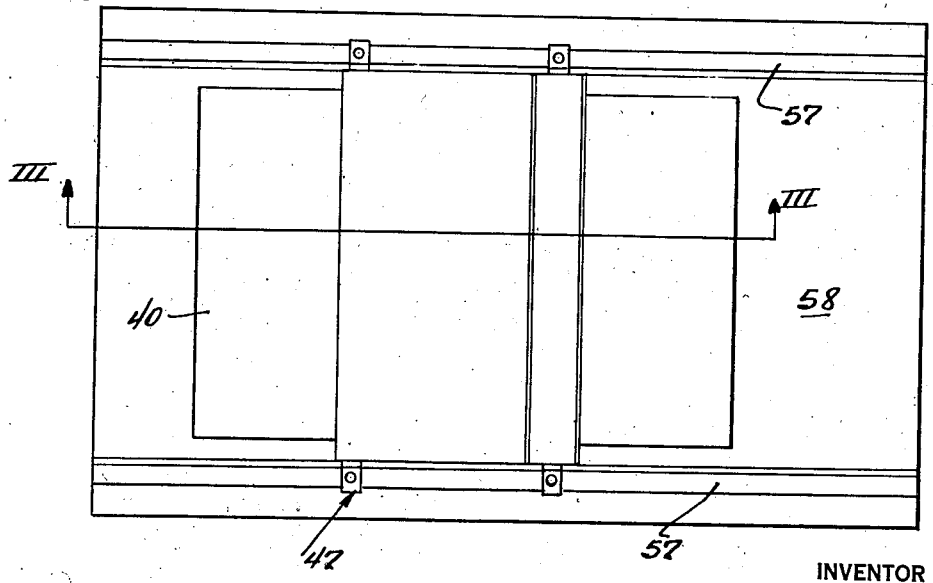
Fig. 2 is a plan view of a slightly modified embodiment of the invention.
Figure 3:
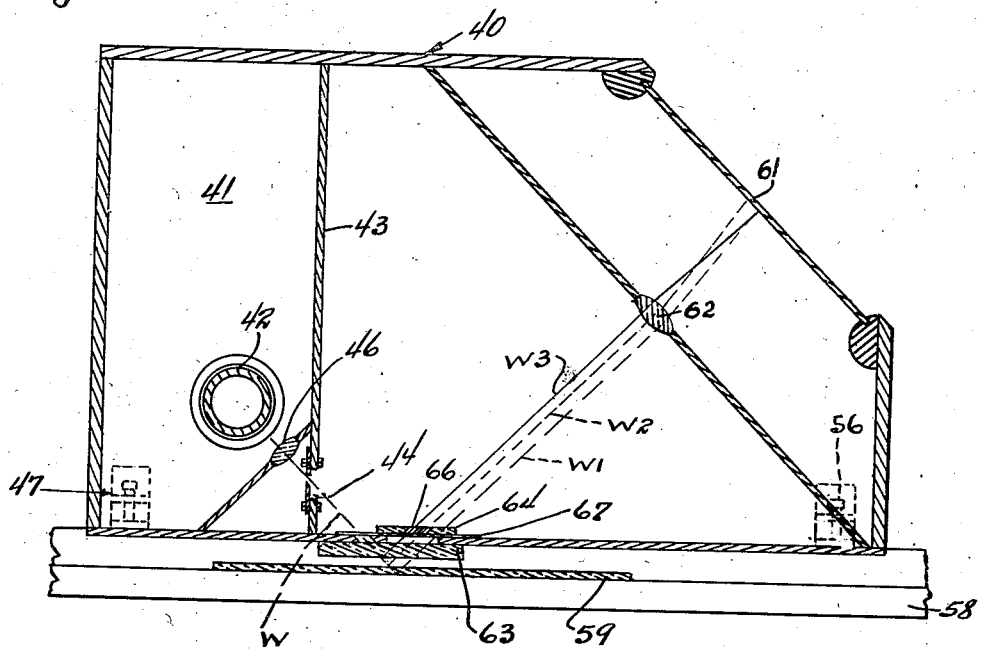
Fig. 3 is a sectional view taken substantially upon the line III—III of Fig. 2.

In the embodiment of the invention disclosed in Fig. 1 a suitable cabinet or closure 14 for the apparatus includes a back wall 15, side walls 16, a front wall 17, a cover or top 18 and if desired a bottom 19, having opening 20 for transmission of a beam of light. Internally, the case may be provided with a vertical partition 21 forming a cell for a source of light, such as a conventional fluorescent tube 22, an electrical bulb, an arc or other convenient source of light. If the tube is employed it may be supported by suitable sockets 23 at the ends thereof attached to the side walls 16. Preferably all internal surfaces are blackened to reduce stray reflection.

Partition 21 is provided with a suitable opening 24 near the bottom edge thereof, which opening may extend any desired distance transversely and which is designed to permit the passage of a narrow band of light passing obliquely downwardly. This beam may be regulated as to width and position by means of adjustable plates 25 secured to the partition on either side of opening 24.

In order to collimate and intensify the band of light passing through the slot 24, a lens 27 may be supported in an opening in an obliquely disposed partition 28 between the slot and the source of illumination. This lens may be spherical or it may comprise an elongated bar of transparent material, such as glass having cylindrical surfaces designed to refract the light transversely without appreciably refracting it longitudinally, thus producing a long transverse illuminated band or line upon the reflecting surfaces. The beam producing the band or line is oblique to the plane of the glass transversely of the line, but is perpendicular to the axis of the line of reflection.

The bottom 19 is designed to rest upon the upper surface of a plate of glass 29 to be tested, which in turn is supported upon a reflective surface, such as that of a standard plate 30 of glass or other material susceptible of receiving a polish and being made as flat as possible. In order to prevent marring of the surfaces, spacing elements, such as pieces 31 of tape, felt or the like, may be interposed between plate 29 and the polished surface of the body 30.

It will be apparent that the slot 24 is disposed transversely of the light reaching it with its axis parallel to the polished surface of the plate 30. The light band from the source 22 passing through the slot 24 passes downwardly through the opening 20 in the bottom of the cabinet. A small component may be reflected by the upper surface of the latter, but the main portion passes downwardly through the plate 29 along the line A until it strikes the lower face of the plate. A small component from the incident surface is then reflected upwardly along the line B. The main portion of the beam continues downwardly along the oblique line C until it strikes the surface of the plate 30 and is then reflected back upwardly obliquely along the line D. The components B and D then pass along parallel lines toward a translucent diffusing screen 32 disposed at a suitable angle at the forward extremity of the cabinet between the forward edge of the top 16 and the end wall 17. This screen may be of ground glass or any other suitable translucent material designed to create visible images of the slot 24 by reflection from the bottom surface of the plate 29 and the top surface of the plate 30.

The images, if desired, may be magnified by means of a second lens 33 disposed in an obliquely disposed partition 34 in the cabinet. This lens may be spherical or cylindrical as desired. Ground glass or screen 32 may be plain or if preferred may be provided with suitable straight line rulings 36 by means of which the straightness and spacing of the images of the slot 24 as reflected by the glass plates 29 and 30 can be determined.

The width of the slot 24 may be of substantially any desired value, for example, it may be approximately twice the width of the normal space between the plates 29 and 30. However, any other value may be employed if so desired. The spacing between the plates will depend upon the degree of local bow or bend in the glass surfaces. A local bow downward will bring the surfaces close together. A bow upwardly will increase the spacing. Such increase or decrease in the spacing produces an increase or decrease in the spacing of the two bands of light upon the screen 32, and thus provides a criterion of the surface flatness of the sheet to be tested. The appearance of these images is illustrated in Figs. 6, 7 and 8. The normal appearance of course will depend upon the width of the slot 24 in the wall 21, as well as the arrangement of the parts of the apparatus.

In Fig. 6, the slot is proportioned and arranged so that the image as reflected from the flat undersurface will overlap the image from the plate to be tested. Assuming that the plate to be tested is substantially flat the overlap is substantially as indicated in the figure. The overlapping portions of the image show up as a relatively bright line, the width of which constitutes a criterion of the spacing of the plates, and therefore of the degree of flatness of the plate to be tested. Assuming that the plate to be tested is not perfectly flat the spacing may be so great that the images will actually be separated by a band as indicated in Fig. 7. The degree of spacing and therefore of flatness may also be judged by observation of the rulings 36 upon the plate 32. This admits of determining the spacing and also the straightness of the images cast upon the plate of glass.

In Fig. 8 is shown an arrangement in which the edges of the two images are adjusted to substantially coincide where the plate to be tested is substantially flat and smooth. With this arrangement of the parts it will be apparent that as the degree of flatness and smoothness of the plate to be tested varies either positively or negatively the images will tend to separate to provide a dark line or will tend to overlap in such manner as to provide a bright line down the middle. The width of these two lines constitutes the criterion of flatness of the plate. It will be apparent that either the apparatus 14 may be slid about over the plate 29, in order to make observations of various portions thereof or the plate 29 may be moved about upon the supporting surface 30. Of course care must be observed that the beam of light from the source 22 is not interrupted by the spacing elements 31.

In the embodiment of the invention shown in Figs. 2, 3, 4 and 5, the testing apparatus is supported upon suitable guides disposed upon or above a supporting structure for a plate of glass to be tested. In this embodiment of the invention the apparatus comprises a cabinet or chamber 40 substantially corresponding to the cabinet or chamber 14 already described. It includes a cell 41 for a source of illumination 42, and partition 43 with a slot 44. A lens 46 either spherical or cylindrical is also supported between the slot and the source of illumination.

Figure 4:
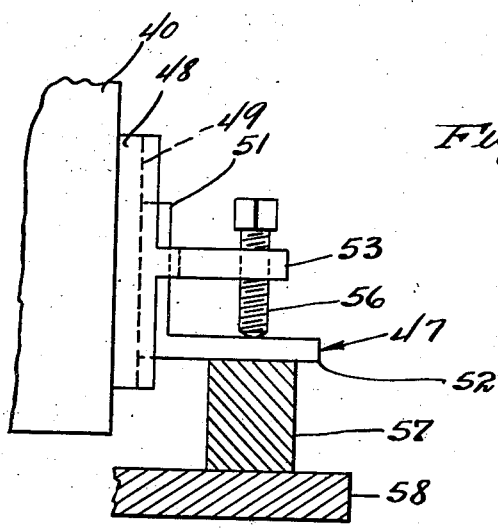
Fig. 4 is a fragmentary elevational view of an adjustable supporting element for the construction shown in Fig. 3.

The cabinet at its sides is provided with adjustable supports 47 which are shown in detail in Figs. 4 and 5. Each support includes a guide element 48 secured to a side of the cabinet 40 and having a guideway 49 of dovetail section formed therein. Slide element 51 is disposed in the guideway and is provided with a laterally projecting bracket 52. A second bracket 53 is formed upon the guide element 48 and has an opening 54 formed therein through which the slide 51 is adapted to pass. This second bracket is bored and tapped to receive a set-screw 56 by means of which the spacing of the two brackets 52 and 53 can be varied.

Brackets 52 rest upon guide-rails 57 having straight and accurately leveled surfaces and also resting upon a suitable supporting surface, such as a table top 58. The plates of glass 59 to be tested rest upon this top between the guide-rails in position to receive a beam of light W from the source 42 and passing through the slot 44. The beam is reflected upwardly in part by one or both of the surfaces of the plate 59 along the lines W' and W$^2$ and is subsequently received upon a glass screen 61 corresponding to the screen 32 already described. A lens 62 may be disposed between the glass plate and the screen in such position as to focus magnified images of the slot 44 upon the screen.

In order to provide a reference image upon the screen a plate 63 which is accurately ground and polished to a flat surface may be secured to the bottom portion of the cabinet 40 in position to receive the beam W and reflect a component W$^3$ upwardly through the lens 62 and thus provide a reference image upon the ground glass screen.

If desired the reflection from one of the surfaces of the plates 59 and 63 may be intercepted in order to provide single sets of images, thus permitting observation of the flatness of one surface without introducing any disturbance due to the reflection of the other surface of the same plate by means of a slotted grid 64 having openings 66 so disposed therein as to permit the desired reflection to pass, but to intercept the unwanted reflections. This grid is slidably supported upon brackets or guides 67 upon the side walls of the cabinet 40, thus permitting the grid to be adjusted backward or forward in such manner as to intercept the desired beams.

In the arrangement of the apparatus shown diagrammatically in Fig. 10 the plate providing the reference beam is indicated at 70 and is disposed at a slight angle with respect to the horizontal. This element is of plate glass accurately ground and is designed to receive a beam of light Y from the source 72 and passing through a collimating lens 73, and to reflect it diagonally upward along a line 74. It may be received by a lens 75 and magnified by the latter upon a suitable translucent screen 76 corresponding to the glass screen 32. The main components of the beam Y pass through the plate 70 and are received by a glass plate 77 to be tested. Components of this beam are reflected along the lines Y² and Y³ to the lens 75 and after refraction by the latter are focused upon the screen 76. The angle of plate 70 is so adjusted that the image reflected thereby is focused midway between the images reflected from the top and bottom surfaces of the plate 77. The latter two images can thus be compared simultaneously with the image from the plate 70, thus admitting of determination at a single observation of the degree of flatness of both surfaces of the plate to be tested. In the construction as shown in Fig. 10 if observation is to be made of the reflection of both surfaces of the plate to be tested the grid structure 64 should be eliminated.

In the operation of the embodiment of the invention disclosed in Figs. 2, 3, 4, 5, and 10 a plate 59 is disposed upon the table 58 and the set-screws 56 are adjusted accurately to level the cabinet 40 at a desired height from the plate. The cabinet can then be slid backward or forward along the guide-rails to make observations of any and all portions of the surface which it is desired to test. Assuming that the source of light 42 is sufficiently elongated and that the lens 46 is cylindrical, also that the slot 44 is of sufficient lateral width, it is possible to observe the entire width of a plate upon one or both sides.

The forms of the invention herein shown and described are to be considered merely as exemplary. It will be apparent to those skilled in the art that numerous modifications may be made therein without departure from the spirit of the invention or the scope of the appended claims.

What I claim is:

1. Apparatus for measuring the flatness of a surface of a glass plate, said apparatus comprising a standard plate having a polished surface, means to support a plate to be tested adjacent to and in spaced parallel relationship to the polished surface of the standard plate, said means permitting light passing through one plate to strike the surface of the other, a source of illumination disposed to project a laterally elongated band of light obliquely upon one plate and through the latter upon the other plate and a diffusing screen adapted to receive images of the bands reflected from the plate to be tested and the standard plate to permit accurate comparison of the images.

2. Apparatus as defined in claim 1 in which a lens is disposed between the surface to be tested and the diffusing screen.

3. An apparatus as defined in claim 1 in which the means to support the plate to be tested comprises spacing elements of equal thickness disposed upon the standard plate, said spacing elements being spaced with respect to each other so that light can pass through one of the plates and between the spacing elements and strike the other plate.

4. Apparatus for determining the flatness of a surface of a glass plate and comprising a standard plate having a polished flat surface, means to support a glass plate to be tested adjacent to and in superposed spaced parallel relationship to the polished surface, a source of light spaced from the polished surface and directing a beam obliquely toward the plates, a partition having a slot formed therein in laterally extending direction with respect to the beam of light and with its axis parallel to the polished surface in position to transmit a narrow band of light obliquely upon the plates, and a screen of diffusing material disposed to receive the images of the band produced by reflection from the polished surface and from the plate to be tested in side-by-side relationship for purposes of visual comparison.

5. Apparatus as defined in claim 4 in which a lens is provided between the surface to be tested and the diffusing screen to provide magnified images of the band upon the screen.

BENJAMIN H. VINE.